B. KEMPLER.
AUTOMOBILE FENDER.
APPLICATION FILED FEB. 9, 1917.
1,240,057.
Patented Sept. 11, 1917.
2 SHEETS—SHEET 2.
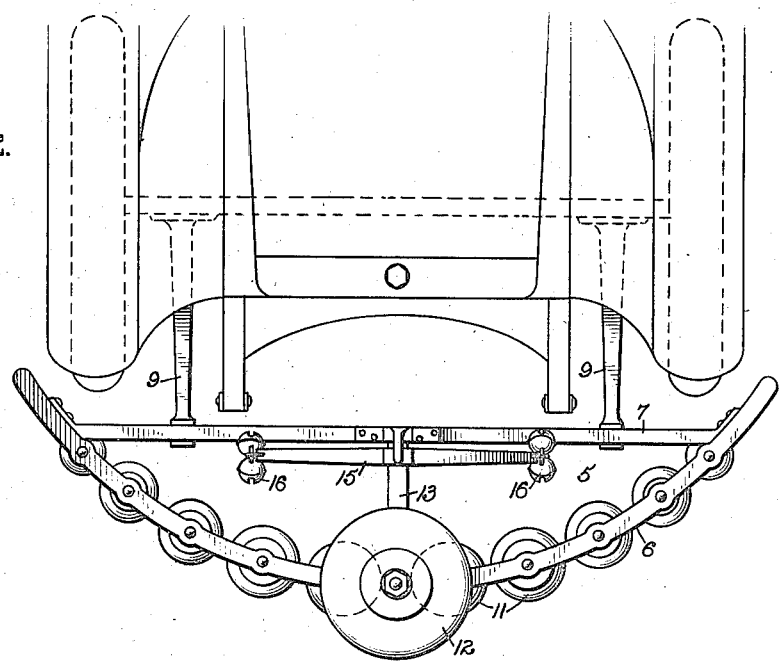
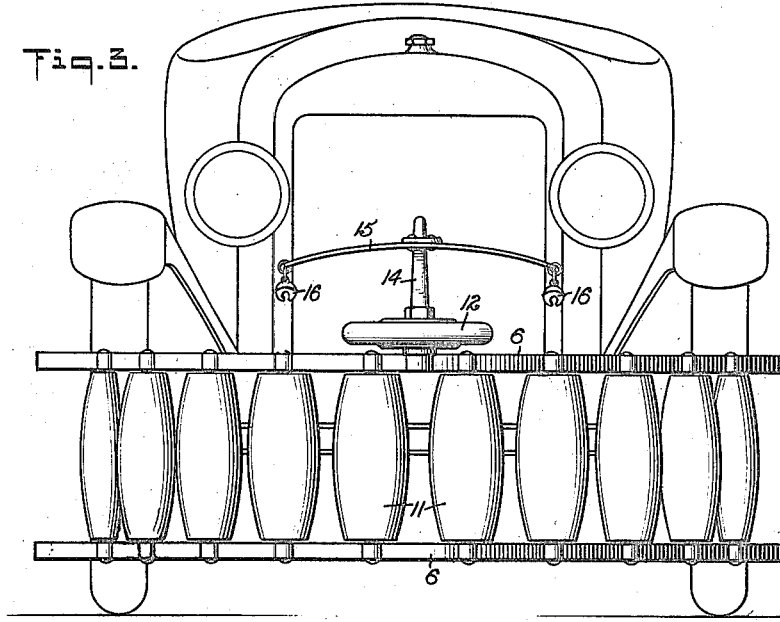

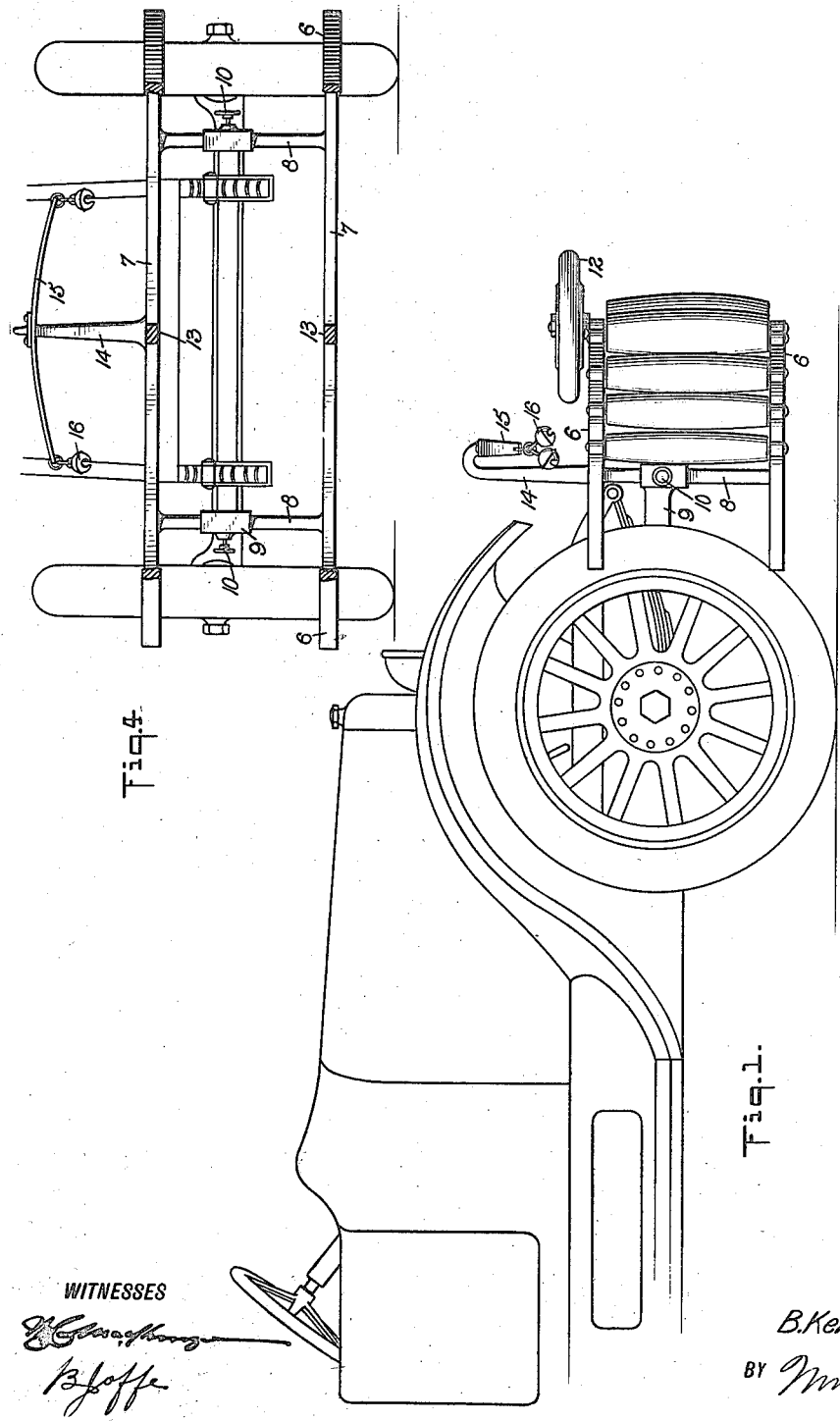

UNITED STATES PATENT OFFICE.

BENJAMEN KEMPLER, OF NEW YORK, N. Y., ASSIGNOR OF ONE-HALF TO SAMUEL WALD, OF NEW YORK, N. Y.

AUTOMOBILE-FENDER.

1,240,057. Specification of Letters Patent. Patented Sept. 11, 1917.

Application filed February 9, 1917. Serial No. 147,572.

*To all whom it may concern:*

Be it known that I, BENJAMEN KEMPLER, a citizen of the United States and a resident of the city of New York, borough of Bronx, in the county of Bronx and State of New York, have invented a new and Improved Automobile-Fender, of which the following is a full, clear, and exact description.

My invention relates to fenders for automobiles, and the object thereof is to provide a simple and efficient fender.

Reference is to be had to the accompanying drawings, forming part of this specification, in which like characters indicate corresponding parts in all the views.

Figure 1 is a fragmentary side elevation of an automobile equipped with a fender embodying my invention;

Fig. 2 is a plan view of the fender as it appears at the front of the automobile;

Fig. 3 is a front elevation; and

Fig. 4 is a similar elevation with the rolling elements broken away to show the details of construction for adjusting the fender frame.

Referring to the drawings, 5 is a rigid frame presenting arcuated front members 6 disposed in a substantially horizontal plane and spaced parallelly from one another. The tie bars 7 of the frame extending between the arcuated members 6 are joined by vertical stays 8 which are mounted to slide in brackets or arms 9 extending from an axle of the automobile. The stays 8 can be locked within the brackets at any position by means of clamping members 10 so as to maintain the frame 5 at any desired position from the ground.

A plurality of rollers 11 are mounted between the arcuated members 6. The rollers are preferably of barrel shape and decrease in size from the central part of the frame toward the ends thereof. Said rollers can be made of any suitable rigid material. The upper arcuated member carries a wheel 12 disposed substantially in a horizontal plane and revolving on a substantially vertical pin provided on the member 6. The rim of the wheel 12 is of yielding material, such as rubber. It is so mounted on the member 6 that a portion thereof projects ahead of the rollers 11 directly underneath said wheel.

The central part of the frame 5 is reinforced by braces 13 extending between the arcuated member 6 and the tie bar 7. The frame 5 is preferably provided with a post or upright 14 to which a yielding member 15 is secured and which carries at the ends thereof bells 16 for producing sufficient noise to attract attention.

When a person is in the path of the automobile, if he is first engaged by the wheel 12, said wheel will turn, moving the person toward the rollers 11, which will roll him off to one side of the automobile. If he comes in direct contact with the rollers without coming first in direct contact with the wheel, the rollers will shove him to one side, thereby preventing injury to the person.

I claim:

1. A fender of the class described, comprising a rigid frame presenting arcuated front members disposed in substantially horizontal planes and spaced parallelly from each other, rollers mounted to revolve between said arcuated members, a wheel mounted to revolve in a horizontal plane associated with the frame so as to project ahead of the rollers in proximity to said wheel, and means for adjustably securing said frame.

2. A fender of the class described, comprising a frame having an arcuated front, barrel-shaped rollers mounted to revolve on substantially vertical axes at the arcuated front, a wheel carried by the frame to revolve in a substantially horizontal plane, said wheel being adapted to project above the rollers directly underneath, and means for adjustably securing the frame.

3. A fender of the class described, comprising a rigid frame presenting arcuated front members disposed in substantially horizontal planes and parallelly to each other, barrel-shaped rollers mounted to revolve between said arcuated members on substantially vertical axes, a wheel mounted to revolve in a horizontal plane and secured to the upper arcuated member so as to project ahead of the rollers directly underneath said wheel, and means for securing the frame adjustably in a vertical plane.

BENJAMEN KEMPLER.